United States Patent [19]

Bernt

[11] 4,408,450

[45] Oct. 11, 1983

[54] REPAIR OR REPLACEMENT LINK

[76] Inventor: Jorgen O. Bernt, 1357 Amber Crescent, Oakville, Ontario, Canada

[21] Appl. No.: 297,742

[22] Filed: Aug. 31, 1981

[51] Int. Cl.³ .............................................. F16G 13/06
[52] U.S. Cl. ...................................... 59/88; 403/331; 403/339
[58] Field of Search .................. 59/84, 85, 87, 88, 89; 403/339, 340, 331, 319, 355

[56] References Cited

U.S. PATENT DOCUMENTS 599,927  3/1898  Brooks ..................................... 59/85

Primary Examiner—Daniel C. Crane
Assistant Examiner—David B. Jones

[57] ABSTRACT

A chain link has two U-shaped portions designed to interfit to provide a complete link. An end of each of the portions is connected to that of the other portion by a twisting advance. The other end of each portion is designed to provide abutting faces which are juxtaposed after each twisting advance. Attaching means connect the abutting faces to prevent removal in the reverse pattern to such twisting advance.

14 Claims, 6 Drawing Figures

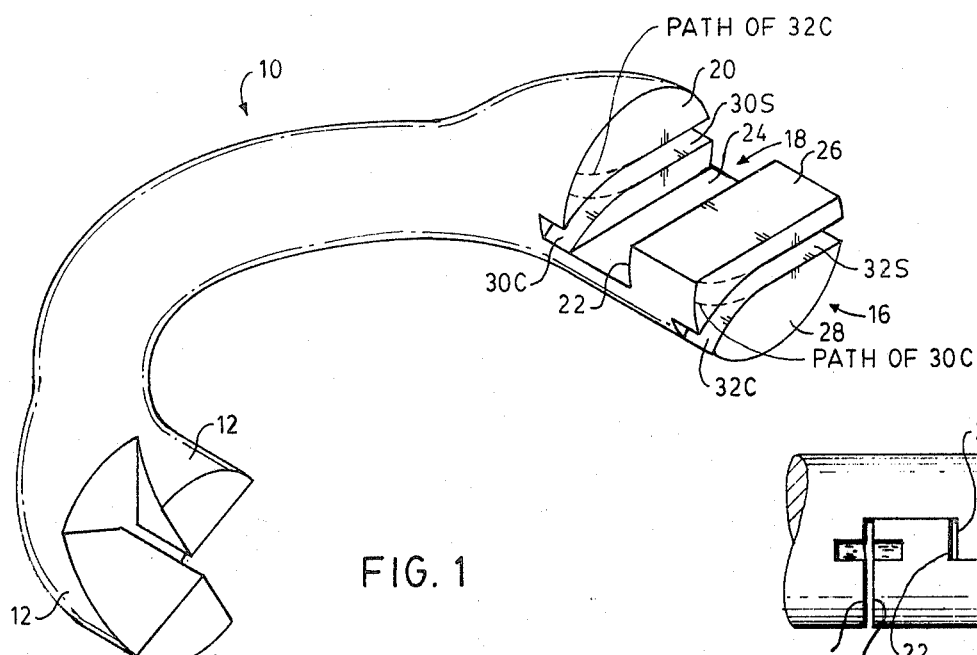
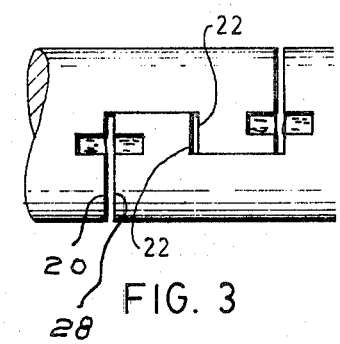
FIG. 3
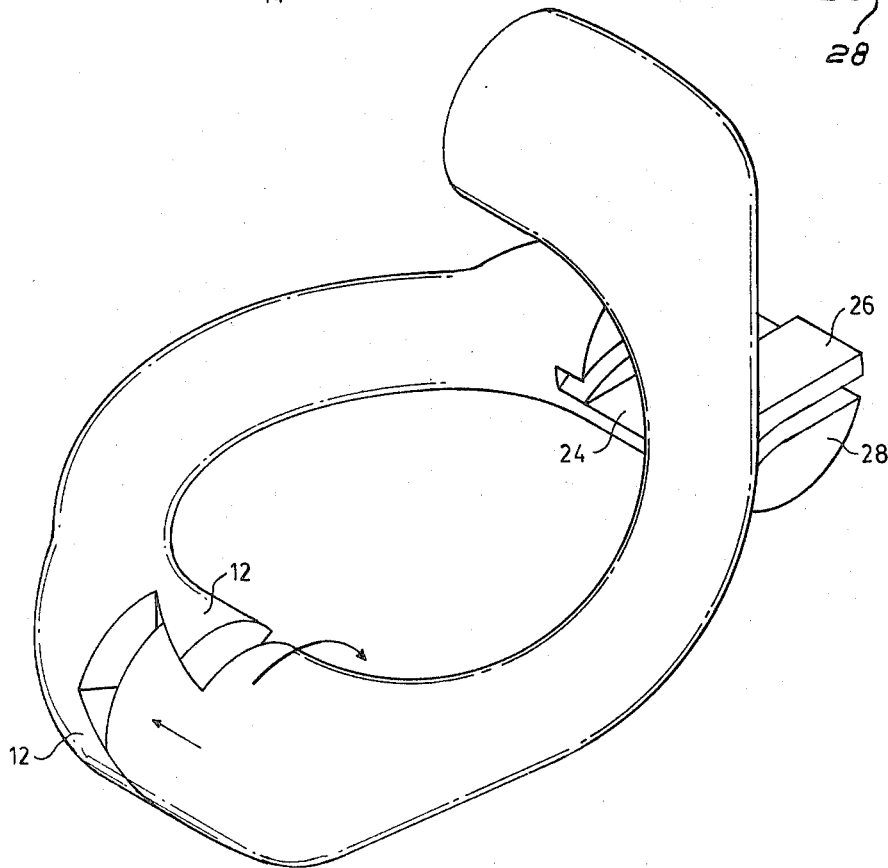
FIG. 2

REPAIR OR REPLACEMENT LINK

This invention relates to the design of a chain link of the type used to replace a worn link in an existing chain or to connect an existing chain to another article. The link is thus often referred to as a repair or replacement link.

In prior designs for repair or replacement links, the link is made from two pieces held together by welding, rivetting or both, or by other means requiring the use of specialized tooling. Thus prior designs have required the inconvenience of welding equipment; the need for hammer and anvil to perform the rivetting (plus the very real danger of damage to the link parts; or the expense of other special equipment).

It is the object of this invention to provide a link, suitable as a repair or replacement link, comprising two portions, designed to be combined to form the ring of the link, which two portions may be assembled by hand, and which are held together by locking devices requiring only the light impact blows of a hammer.

It is an object of the invention to provide a repair or replacement link which may, if desired, be provided in similar dimensions and appearance as standard round links made from round stock.

It is an object of the invention to provide a repair or replacement link which may, if desired, be designed to be circular on the inside (i.e. on the contact surface for the link) and balanced, so that; when hanging as part of a chain, the link is free to rotate without tendency to return to any one position. This feature is important to secure even wear and hence maximum useable life of the repair or assembly link.

Figure 6:
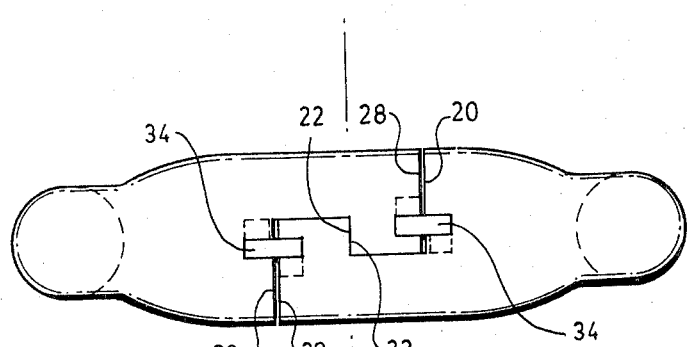
Figure 5:
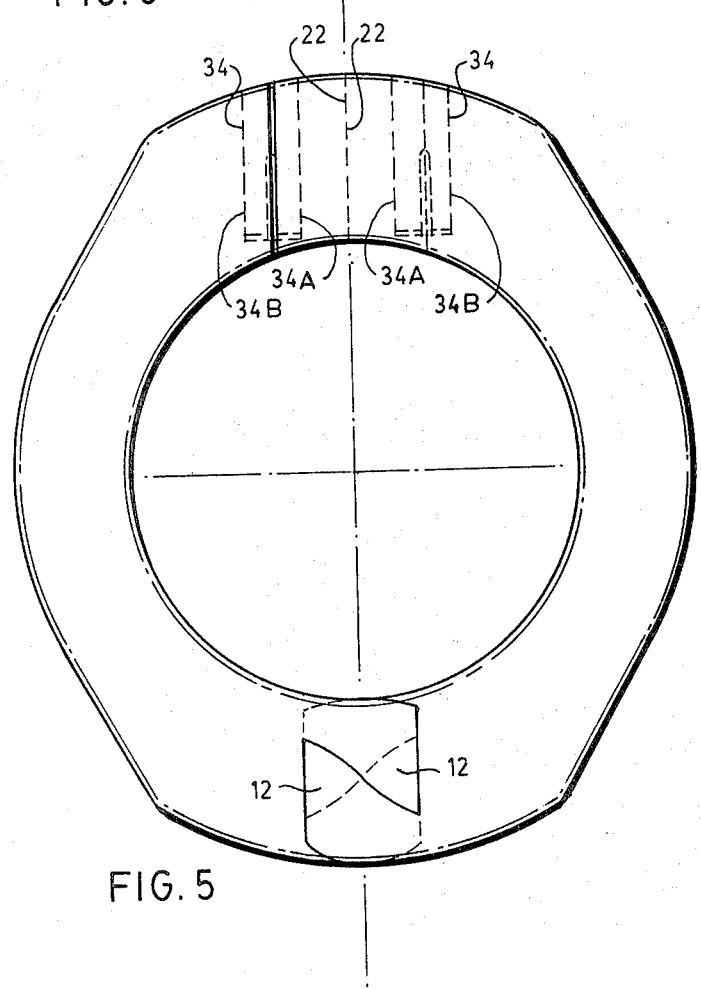
Figure 4:
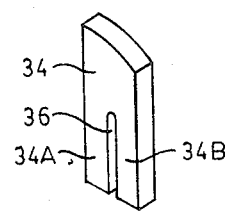

In drawings which illustrate a preferred embodiment of the invention:

FIG. 1 is a perspective view of a link portion,

FIG. 2 shows the link portion of FIG. 1 with the other link portion in the course of being attached thereto, FIG. 3 shows a detail of the link portions in assembled position, viewed from the outside of the link, FIG. 4 shows the insert for use with the link portions, FIG. 5 is a side view of the assembled link with the insert in place, and FIG. 6 is a top view of the assembled link with the insert in place.

In the drawings see FIGS. 1 and 2 are shown two link portions preferably identical each having a U-shape, defining two free ends facing in the same direction. The two portions 10 are preferably formed of round stock extending about a circular arc and exceeding a semi-circle only to the extent that the free ends of the two portions should overlap each other as hereinafter described; and differing from a constant cross-section only to the extent that provision is made for a thickened shape at the overlaps.

One of the free ends of each link portion 10 is cut to provide two splines 12 each containing, in cross-section substantially a 90° sector and defining two, slightly larger but nearly complementary 90° sector grooves. (The splines are slightly smaller than the grooves to provide for a loose sliding fit when the portions are assembled and for a gap between the two splines). Relative to the circular axis of the toroid of the link, the splines 12 and grooves rotate about 26° from their inner to their free ends. With two identical link portions, it will be obvious that with the splined ends 12 facing one another and the other ends also facing one another, (as shown in FIG. 2) that the two link portions are complementary and may be translated into overlapping relationship while the links are rotated about 26° with respect to one another. When this is done the other free ends of the link portions are designed to interlock as hereinafter described.

At the other free end of the link portion the rounded stock of the link portion is cut away on the side to receive the complementary side of the other link member on its approach under the twist dictated by the helical tines. Thus the other free end is cut away to provide a groove 18 facing the approach of the other link member. The groove is defined by an inner flat face 20 on the round stock and an outer flat face 22 parallel thereto. The base of the groove is defined by the face 24. Outward of face 22 a face 26 is provided parallel to face 22 and end face 28. Thus faces 20, 22 and 28 are parallel, approximately perpendicular to the toroidal axis and perpendicular to the median plane of the toroid. Faces 24 and 26 are parallel to the median plane.

As will be apparent from the Figures, Faces 20, 24 and 22 define a groove in one link portion which receives the projection defined by Faces 22, 26 and 28 of the other link portion so that:

face 20 of one link abuts face 28 of the other link face 24 of one link abuts face 26 of the other link face 22 of one link abuts face 22 of the other link It will further be noted that the links interfitting in this way define 3 pairs of mutually facing surfaces being: two pair being comprised of the end face 28 of one of the link portions and the inner face 20 of the other and the third pair being the step faces 22 of the two link portions. It will be further noted that the two stepped end faces 22 of the link portions are arranged to be mutually facing as shown in FIGS. 3 and 6 when the helically pronged members are advanced and twisted to achieve their full overlap. (The fit of the three pairs of mutually facing surfaces is just loose enough that this may be achieved without chamferring the surfaces to compensate for the helical advance).

It will be noted that the pair of step surfaces 22 form stop surfaces preventing translatory separation of the link portions without an accompanying rotating movement.

Each face 20 is provided with a groove 30 extending inward for a straight extent 30S from the outer surface of the link portion and then, in approaching the inward end curving at 30C. Each face 28 is provided with a groove 32 extending inward for a straight extent 32S from the outer surface of the link portion and then, in approaching the inward end curving at 32C in the same sense as curve 30C. The location and direction of grooves 30S and 32S are selected so that in the assembled link the groove 32S of one portion faces the groove 30S of the other portion and between them define a passage for the insert 34 of FIG. 4. The curved portions 32C and 30C in the mutually facing grooves, diverge and, in FIG. 1 or face 20 the dotted lines indicate the diverging path of the groove 32C of the other link portion, while or face 28 the dotted lines indicate the diverging path of the groove 32C of the other link member.

The insert 34 is preferably of the same material as the link portions but in any event must be strong enough and of other physical qualities to withstand the stresses and ambient conditions encountered by the link in use. The insert 34 is a thin member of a thickness and width to be slidably received in the opening defined by the facing grooves 30S and 32S. The insert 34 on its split by a cut 36 from the intended entrance end to provide separate strips 34A and 34B to a depth (and of widths) corresponding to the intended insertion of these strips into 30C and 32C diverging portions of the grooves.

With the spline portions 12 and 12 of the link portions twisted and advanced into overlapping relationship (FIG. 2 shows the two members being rotated and advanced toward this position), the three pairs of facing surfaces 20-28, 22-22 and 28-20 are in place. The two inserts 34 are then, with light impact blows of a hammer, hammered into the respective opening defined by the two pairs of facing grooves 32S-30S, 30S-32S. When each insert reaches the diverging portions of the grooves its two parts 34A and 34B are bent and in this manner the insert is fully seated and retained in the groove. The inserts 34 prevent twisting of the link portions 12 relative to each other. With such twisting prevented, the faces 22-22 of the two link portions prevent separation of the link at the stepped free ends while the helical splines prevent the separation of the link at the other free end. There is thus provided a repair or replacement link which is inexpensive to produce, is easily assembled and secure in use.

The preferred form of the link is to be thickened at the overlapping portions and with the thickened portions being faired into the remaining parts of the portion extents. Taking this into account the inner (working) surface of the assembled link is preferably made circular and the assembled link is designed to be of approximately equal weight about its circumference to achieve random orientation and equal wear in use.

However the invention covers assembled links as above described operating which are not circular but may be oval or oblong. The helically spiralling complementary splines may be different providing, they are complementary and helical. When the twisting is completed the stop surfaces 22-22 in the embodiment must be facing in complementary stepped members on the other side. At least one set of faces must be grooved as described for the use of at least one insert. The grooved faces may also be the stop faces although this will not be nearly as strong as the grooving in the other faces as shown and using two inserts.

I claim:

1. Chain link comprising:
    two link portions desinged to interfit to provide a complete link,
    each link portion comprising a general U-shape terminating in two free ends extending in substantially the same direction,
    one free end of one link being provided with grooves helical with respect to the centre line of the link,
    a free end of the other link being provided with helical spline members substantially complementary to said helical grooves and designed to be inserted therein on the twisting and advancement of one of said portions relative to the other,
    the other free ends of the respective links being designed to overlap, in a complementary manner on said twisting and advancement of the other ends,
    said other free ends proving, on overlapping in response to said advancement and twisting, a pair of mutually facing surfaces on said respective members preventing movement of one of said ends away from the other, and,
    means used on cooperation with said other free ends in their interfitted position for preventing such other free ends from rotating to allow separation of said other free ends.

2. A chain link as claimed in claim 1 wherein said rotation preventing means comprise:
    mutually facing surfaces on said respective other free ends having their major component perpendicular to said withdrawal direction, said mutually facing surfaces being grooved to define mutually facing grooves extending from an outside surface of said link, such grooves being shaped to curve so that their inner ends diverge from their mutually facing relationship,
    an insert inserted into the open ends of the mutually facing grooves at said outer surface said insert being split for a distance backward from said leading edge into two extents designed to fit into the respective divergent portions of said grooves.

3. Link composed of two interfitting portions, each portion being U-shaped and having two free ends for respectively overlapping with the two free ends of the other portion,
    the assembled link defining a median plane generally parallel to the link material,
    one pair of overlapping free ends including a pair mutually facing surfaces respectively forming part of said free ends,
    said mutually facing surfaces being substantially perpendicular to the median plane of said link and each facing in the direction for withdrawal of the link portion to which it is attached, from the other link portion, P1 means operable in cooperation with said one pair of overlapping free ends, to prevent their movement transverse to said median plane to remove said surfaces from their mutually facing position,
    the other pair of overlapping free ends of the respective link portions being designed to define complementary, overlapping extents shaped to require twisting about the direction of advance between said overlapping free ends to achieve said overlapping relationship,
    said respective pairs of overlapping ends being designed so that the twisting advance movement of said other pair of overlapping free ends bring the said surfaces of said one pair of free ends into mutually facing relationship.

4. A link as claimed in claim 3 wherein each of the pair of mutually facing surfaces at said overlapping free ends defines a groove,
    and wherein the grooves are arranged to be mutually facing for an extent inward from an outer surface of the assembled link and inwardly diverging from each other,
    an insert in said grooves designed to be inserted from said surface the inner portion of said insert being split to include divergent extents resting in said divergent grooves and the outer portion of said insert resting in said mutually facing extents.

5. A link as claimed in claim 2 where said mutually facing surfaces resisting removal of the links are different from the mutually facing surfaces providing said grooves.

6. A link as claimed in claim 4 where said mutually facing surfaces resisting removal of the links are different from the mutually facing surfaces providing said grooves.

7. A link as claimed in claim 2 where said other free ends each provide in their overlapped arrangement, three pairs of mutually facing surfaces, the intermediate pair facing the withdrawal direction for the link portion to which they are attached and the other pairs each containing mutually facing and partially diverging grooves, as defined.

8. A link as claimed in claim 4 where said other free ends each provide in their overlapped arrangement, three pairs of mutually facing surfaces, the intermediate pair facing the withdrawal direction for the link portion to which they are attached and the other pairs containing mutually facing and partially diverging grooves, as defined.

9. Chain link comprising:
two link portions designed to interfit to provide a complete link,
each portion comprising a general U-shape terminating in two free ends extending in substantially the same direction,
said portions being designed to be connected to form a ring with two pairs of overlapping free ends, each pair comprising a free end from each of the portions,
one such pair beind designed to be brought into overlapping relationship by advancing the free ends of the portions into overlapping relationship to each other while providing a twisting motion of one link portion relative to the other,
the other such pair of free ends being designed to reach an overlapped position on said twisting and advance of said one such pair and to resist separation by translation in the withdrawal direction,
whereby both said pairs of free ends may only be withdrawn from said overlapping relation by twisting of said one pair of free ends plus translation in the withdrawal direction,
means inserted after assembly of said link, cooperating with said other said pair of free ends to prevent such twisting.

10. A link as claimed in claim 9 wherein said assembled link is thickened in cross-section in each of the two areas of overlap of the link portions.

11. A link as claimed in claim 10 wherein the assembled link defines a median plane generally parallel to the link material and said link is symmetrical about an axis perpendicular to its median plane and is approximately balanced about said axis.

12. A link as claimed in claim 9 wherein the assembled link defines a median plane generally parallel to the link material and the inner surface of said link viewed perpendicular to its median plane is substantially circular.

13. A link as claimed in claim 10 wherein the assembled link defines a median plane generally parallel to the link material and the inner surface of said link viewed perpendicular to its median plane is substantially circular.

14. A link as claimed in claim 11 wherein the assembled link defines a median plane generally parallel to the link material and the inner surface of said link viewed perpendicular to its median plane is substantially circular.

* * * * *